(12) United States Patent
Hasegawa

(10) Patent No.: US 7,096,016 B2
(45) Date of Patent: Aug. 22, 2006

(54) HIGH-SPEED ALL-BAND-CELL SEARCH CELLULAR PHONE

(75) Inventor: Osamu Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 452 days.

(21) Appl. No.: 10/443,071

(22) Filed: May 22, 2003

(65) Prior Publication Data

US 2003/0236079 A1    Dec. 25, 2003

(30) Foreign Application Priority Data

May 29, 2002    (JP) .............................. 2002-154888

(51) Int. Cl.
*H04Q 7/20* (2006.01)
(52) U.S. Cl. .................... 455/434; 455/161.3; 455/525
(58) Field of Classification Search ................ 455/434, 455/424, 425, 413, 437, 442, 443, 444, 435.2, 455/161.1–161.3, 168.1, 179.1, 552.1, 525
See application file for complete search history.

(56) References Cited

U.S. PATENT DOCUMENTS 6,052,590 A * 4/2000 Hicks et al. ................. 455/434
6,778,827 B1 * 8/2004 Anderson et al. ........... 455/434
6,807,163 B1 * 10/2004 Shi ............................. 370/337
6,810,251 B1 * 10/2004 Hassan et al. ............... 455/434
7,013,140 B1 * 3/2006 Ostberg et al. ............. 455/434

FOREIGN PATENT DOCUMENTS

WO    WO 01/33881    5/2001

OTHER PUBLICATIONS

Bill Mitchell, "Variable Bandwidth RSSI Scanning", Motorola Technical Developments, Motorola Inc., vol. 28, Aug. 1996, pp. 22-24.*
Universal Mobile Telecommunications System (UMTS); Physical layer procedures (FDD) (3GPP TS 25.214 version 3.4.0 Release 1999), Sep. 2000, pp. 1-48, XP-002166612.

* cited by examiner

*Primary Examiner*—Edward F. Urban
*Assistant Examiner*—Blane Jackson
(74) *Attorney, Agent, or Firm*—Young & Thompson

(57) ABSTRACT

A cellular phone includes a RSSI measurement circuit for measuring power levels of received baseband signal at divided band portions of the whole band, a band sorting circuit sorting the divided band portions based on the descending order of the power levels, and a cell search circuit searching the carriers of each divided band portion in the order of the results of the sorting, to thereby determine a tentative waiting cell.

21 Claims, 7 Drawing Sheets

HIGH-SPEED ALL-BAND-CELL SEARCH CELLULAR PHONE

BACKGROUND OF THE INVENTION (a) Field of the Invention

The present invention relates to a high-speed all-band-cell search cellular phone and a method for searching the band cell based on the specification of IMT-2000 (International Mobile Telecommunications-2000) prescribed in the specification of 3GPP (3rd Generation Partnership Project) standard.

(b) Description of the Related Art

In general, a cellular phone (or mobile station) uses a band-cell search technique for detecting the band cell of the own station for telecommunication. FIG. 8 shows the band-cell detection block of a cellular phone for detecting the band cell. The band-cell detection block 20 includes a RSSI (received signal strength indicator) measurement circuit 22 for measuring the received power levels of a 5-MHz-wide band of the RF signal, a cell search circuit 23 for performing an ordinary cell search for a desired a frequency, and a waiting cell determination circuit 24 for determining the waiting cell based on the information of a tentative waiting cell delivered from the RSSI measurement circuit 22 and the cell search circuit 23. Both the RSSI measurement circuit 22 and the cell search circuit 23 receive the radio frequency (RF) signal through a receiver 21, which receives the RF signal through an antenna (ANT) 24, and deliver signals of the tentative waiting cell to the waiting cell determination circuit 24.

In the cellular phone, a so-called all-band-cell search technique is generally used for detecting the base station to which the location of the cellular phone is to be registered, either after the initial power-on of a cellular phone after it is first introduced into the cellular phone system or after a long-time absence of the cellular phone in the service area. The long-time absence may occur, for example, if the cellular phone travels a long distance while it is turned off and thus there exits no clue for the location identification of the own station. The waiting cell determination circuit 24 receives signals of the tentative waiting cell from the RSSI measurement circuit 22 and cell search circuit 23, and sets the waiting cell after communication with the base station by using the tentative waiting cell.

In the specifications of IMT-2000 prescribed in 3GPP standard, assuming that the RF signal in a cellular phone system uses a total bandwidth of 60 MHz between 2110 MHz and 2170 MHz and that the space between the central frequencies of adjacent two channels is 200 KHz, the number of frequency channels or carriers amounts to 300. All these carriers may be referred to as FID1 to FID300 based on the central frequencies thereof.

The all-band-cell search process includes the steps of slot synchronization to slot identification by the cell search circuit 23 and the step of measuring the received signal code power by the RSSI measurement circuit 22 for each of 5-MHz-wide bands of whole the 60-MHz-wide band to select a 5-MHz-wide band. Thus, the all-band-cell search consumes a large amount of processing time in the cellular phone. For example, if a band-cell search consumes 100 milliseconds for each channel and the band cell of the own station exists only in the FID300 carrier, the all-band-cell search consumes 30 seconds in total after the power-on or long-time absence, assuming that the search is conducted in the ascending order of FIDs in the cellular phone.

SUMMARY OF THE INVENTION

In view of the above, it is an object of the present invention to provide a high-speed all-band-cell search cellular phone which is capable of conducting the all-band-cell search at a higher speed.

The present invention also provides a method for searching the band cell in the all-band-cell search at a higher speed, and a storage device storing the method of the present invention.

The present invention provides a cellular phone including: a first search section for measuring a profile of power distribution of a whole band of the cellular phone to select a band portion from the whole band based on the profile of power distribution, the band portion including therein a plurality of carriers; and a second search section for performing an ordinary cell search for the carriers of the band portion to determine a tentative waiting cell.

The present invention also provides a method for determining a waiting cell in a cellular phone including the steps of: measuring a profile of power distribution of a whole band of the cellular phone to select a band portion from the whole band based on the profile of power distribution, the band portion including therein a plurality of carriers; and searching a tentative waiting cell by using an ordinary cell search for the carriers of the selected band portion.

The present invention also provides a storage device storing a program on which a CPU in a cellular phone is to be run, the program prescribing the steps of: measuring a profile of power distribution of a whole band of the cellular phone to select a band portion from the whole band based on the profile of power distribution, the band portion including therein a plurality of carriers; and searching a tentative waiting cell by using an ordinary cell search for the carriers of the selected band portion.

In accordance with the cellular phone, method and storage device of the present invention, the search time for the all-band-cell search is reduced by selecting the band portion having a higher code power level for the ordinary cell search, because there is a higher probability of existence of the band cell in the band portion having the higher code power level.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings.

Figure 1:
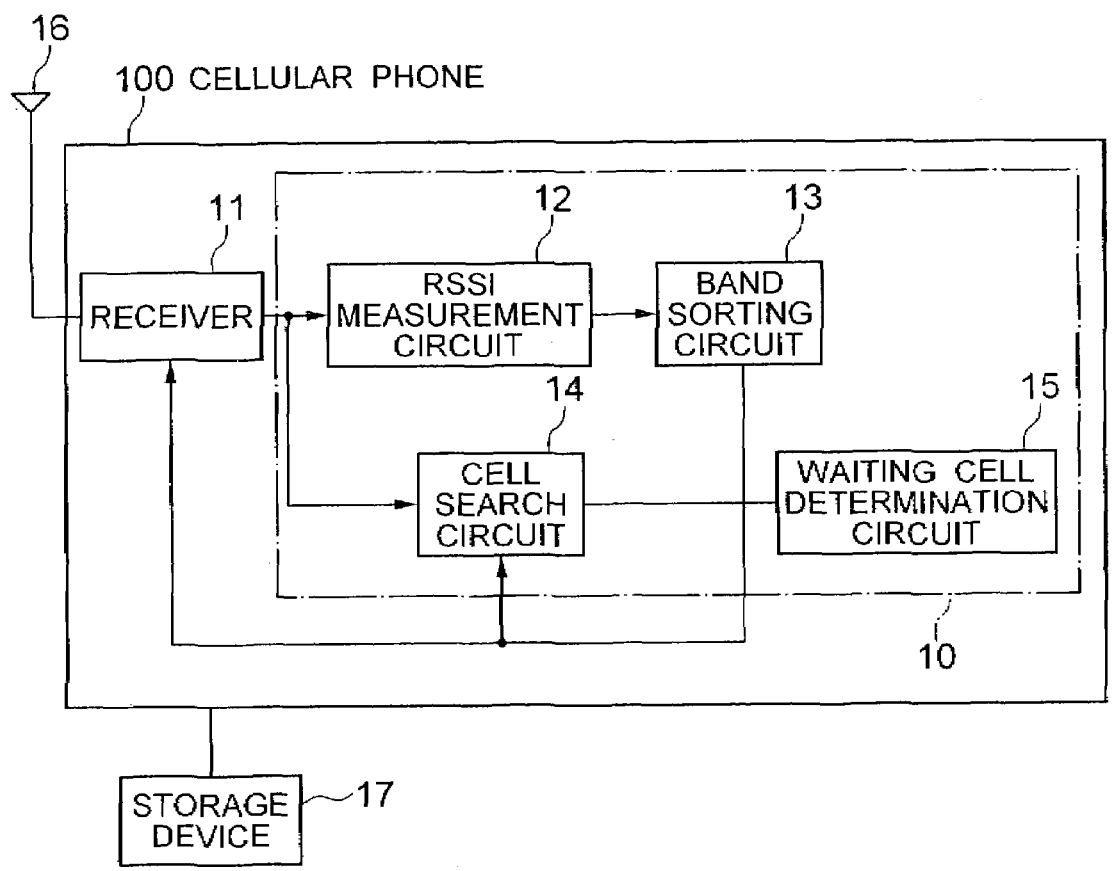
FIG. 1 is a functional block diagram of a band detection block of a cellular phone according to a first embodiment of the present invention.

Referring to FIG. 1, a cellular phone, generally designated by numeral 100, according to a first embodiment of the present invention includes an antenna 16, a receiver 11 which receives radio frequency signals through the antenna 16, and a band-cell detection block 10. The band-cell detection block 10 includes a RSSI measurement circuit 12, a band sorting circuit 13, a cell search circuit 14, and a band cell determination circuit 15. The cellular phone 100 includes a computer (not specifically shown) on which programs stored in a storage device 17 are run.

Both the RSSI measurement circuit 12 and the cell search circuit 14 receive the RF signal output from the receiver 11. The RSSI measurement circuit 12 measures the power level of the received RF signal at divided bands of the whole band of the RF signal to deliver RSSI levels (signal code power levels) of the divided bands to the band sorting circuit 14. The band sorting circuit 13 sorts the divided bands based on the RSSI levels thereof, selects one or more of the divided bands, then delivers the selected divided band and the frequency information thereof to the receiver 11 and the cell search circuit 14.

Hereinafter, IMT-2000 prescribed in the 3GPP standard and used in Japan will be briefly described for a better understanding of the present invention. Based on the specifications of IMT-2000, the down link of the cellular phone system in Japan uses a total frequency bandwidth of 60 MHz between 2110 MHz and 2170 MHz, wherein the space between the central frequencies of adjacent channels is 200 KHz. In such a mobile phone system, the number of frequency channels amounts to 300. These frequency channels may be referred to as FID1 to FID300, hereinafter.

In a W-CDMA (wide band-code division multiple access) scheme used in the mobile phone system in Japan, a chip rate (or spreading rate) of 3.84 Mcps is used in a spread spectrum transmission scheme, and α=0.22 is used for a roll off frequency. This means that the bandwidth for each carrier in the W-CDMA scheme is about 5 MHz, and thus a maximum of twelve carriers can exist for the 60-MHz-wide band in a single service area for avoiding the radio interference etc.

A carrier in the twelve carriers can be specified at an interval of 200 KHz from other carriers of the cellular phone system, although it is prescribed that the central frequency may be slightly adjusted in consideration of specific circumstances of each area, e.g., the central frequency may be shifted by an amount of 400 KHz depending on the each area. This adjustment is exemplified in the "actual bands" between the band(3) and band(4) at the abscissa in FIG. 2. It is to be noted that such a shift amount may be or need not be considered in the division cell search technique used in the present embodiment, as will be described hereinafter.

Figure 2:
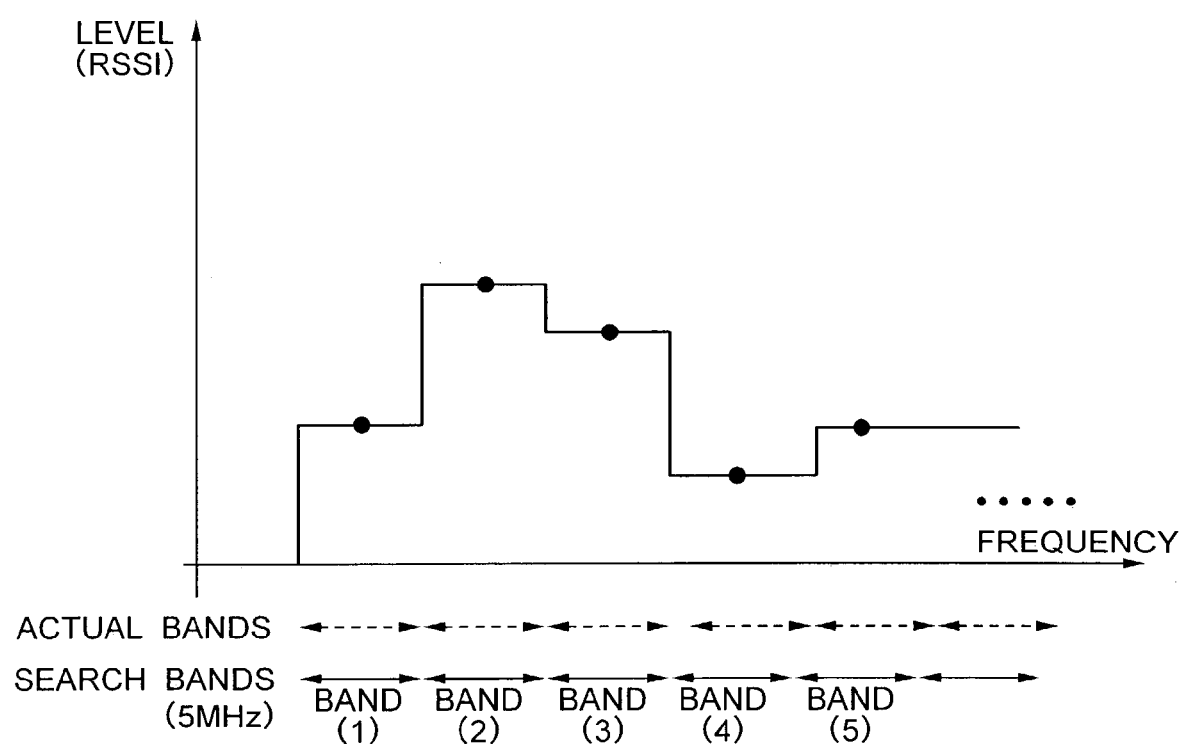
FIG. 2 is a graph showing an exemplified profile of power distribution to be detected by the cellular phone of FIG. 1.

In FIG. 2, division of whole the 60-MHz-wide band by a bandwidth of 5 MHz provides twelve divided band portions, and these twelve band portions can be represented by FID(25×(k−1)+1) to FID(25×k) where k=1 to 12. That is, each band is represented by band(k) and the central frequency of the band(k) is expressed herein by FID(k) where k=1 to 12.

Figure 3:
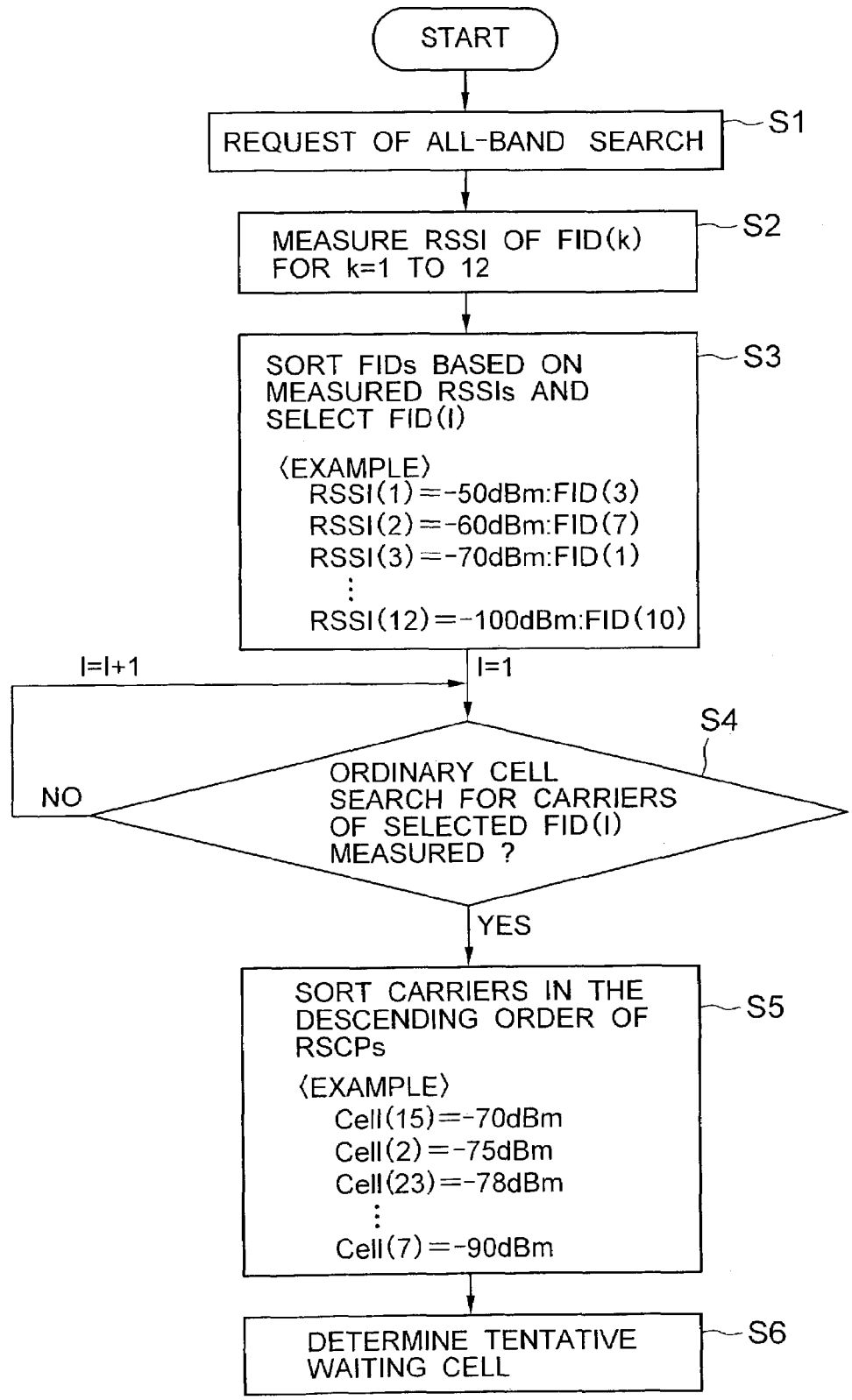
FIG. 3 is a flowchart of the operation of the cellular phone of FIG. 1.

Referring to FIG. 3, there is shown a flowchart of operation in the cellular phone of FIG. 1, which is performed by the program stored in the storage device 17.

For achieving the all-band search to the 300 carriers responding to the request of the all-band-search generated in step S1, whole the 60-MHz-wide band is divided by 12, and a simplified cell search is conducted in step S2 to the divided band portions, band(k), at the central frequency FID(k) thereof, where k=1 to 12.

More specifically, after the RF signal is received through the antenna 16 by the receiver 11, the frequency component of the RF signal corresponding to band(1), or FID(1), is extracted by the RSSI measurement circuit 12 as the baseband signal or zero frequency. The extracted baseband signal is then subjected to the measurement of the power level thereof, wherein the RSSI(k) level for k=1 is measured. Similarly, the RSSI measurement circuit 12 measures the RSSI(k) level for k=2 to 12 in step S2.

The band sorting circuit 13 then sorts the FID(i) and affix priority orders thereto in the descending order of the measured levels of RSSI in step S3. The information of the priority orders of FID(i) sorted in step S2 is delivered to the receiver 11 and the cell search circuit 14, wherein an ordinary cell search is conducted for all the 25 carriers of the band(k) having a highest priority order, the 25 carriers including FID((25×k−1)+1) to FID(25×k).

The term "ordinary cell search" as used herein means the process recommended in "3GPP:TS25.214 Annex C" and including the first step of slot timing identification, the second step of frame timing and PSC (primary scrambling code) group identification, the third step of PSC identification, and the RSCP (received signal code power) measuring step for measuring the received power of CPICH (common pilot channel). The ordinary cell search is conducted by the cell search circuit 14.

The ordinary cell search is conducted for each of all the 25 carriers of band(k) having the highest priority order, and examined if the PSC identification and the RSCP measurement are possible for each carrier (step S4). The cell search circuit 14 arranges the carriers which allow the PSC identification and RSCP measurement in the descending order of the RSCP values in step S5, and then selects a tentative waiting cell which has a highest RSCP value among the cells capable of being identified for PSC (step S6).

The waiting cell determination circuit 15 receives the information of the tentative waiting cell and attempts acquisition of information from the base station and location registry of the own station thereto through the tentative waiting cell. If the attempt is successful, the tentative waiting cell is set as the waiting cell. If the attempt is unsuccessful, such an attempt is conducted for the next cell having the second highest RSCP value among the cells allowing the PSC identification. These attempts are iterated until a successful attempt is obtained or there is no remaining cell allowing the PSC identification.

For example, assuming that the sorted order of RSSI values is such that RSSI(1)=−50 dBm for FID(3), RSSI(2)=−60 dBm for FID(2), RSSI(3)=−70 dBm for FID(7), . . . , RSSI(12)=−100 dBm for FID(10), as shown in FIG. 3, the band sorting circuit 13 delivers an instruction of the ordinary cell search for all the 25 carriers of FID(3) band to the receiver 11 and cell search circuit 14.

In addition, the 25 carriers in the FID(3) band are subjected to the RSCP measurement. Assuming that the results of sorting in the descending order of RSCP of the carriers of the selected FID(3) band is such that cell(15)=−70 dBm, cell(2)=−75 dBm, cell(23)=−78 dBm, . . . , cell(7)=−90 dBm, as shown in FIG. 3, the cell search circuit 14 determines cell(15) having a highest RSSI value among the carriers in the FID(3) as a tentative waiting cell.

If there is no remaining cell and yet all the attempts are not successful for the band(k) in the waiting cell determination circuit 15, then the next band(k') having the second highest RSSI value is subjected to the ordinary cell search for all the 25 carriers until the final waiting cell is found.

The band sorting circuit 13 as well as other circuits may be implemented by the CPU on which the program stored in the storage device 17 runs.

In the above embodiment, the 5-MHz-wide divided band portions obtained by diving whole the 60-MHz-wide band by 12 are first subjected to a simplified cell search by measuring the received code power level to detect the profile of the power distribution in the whole band, and then the ordinary cell search is conducted beginning with the divided band portion having the highest RSSI level. This allows a high-speed all-band-cell search for determining the tentative waiting cell for the cellular phone because the divided band portion having the highest RSSI level is most likely to include therein the band cell.

In a specific example, assuming that the cell search requires 100 milliseconds for each carrier, the total search time for the all-band-cell search is the sum of the time length of the simplified cell search for 12 divided band portions and the time length of the ordinary cell search for 25 carriers, thereby reducing the search time down to 3.7 seconds or about 1/8 of the conventional search time, 30 seconds, as described before.

Figure 4:
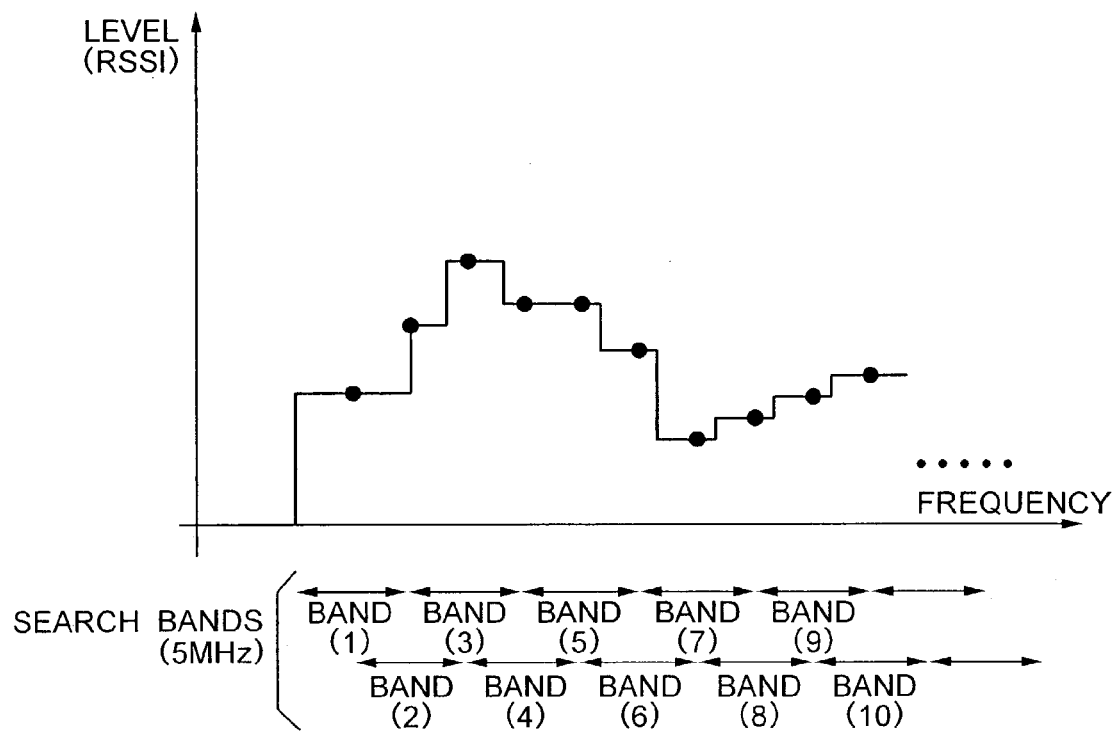
FIG. 4 is a graph showing an exemplified profile of power distribution to be detected by a cellular phone according to a second embodiment of the present invention.

Referring to FIG. 4, there is shown a profile of power distribution to be measured by a simplified cell search conducted by a cellular phone according to a second embodiment of the present invention, which also has a configuration shown in FIG. 1. In this example, the profile of power distribution is measured by a RSSI measurement circuit 12, which measures the received signal power for a 2.5-MHz bandwidth, and the 12 divided band portions are measured for the received power level at the central frequency and the boundary frequency thereof. This raises the accuracy of measurements for the power distribution.

Figure 5:
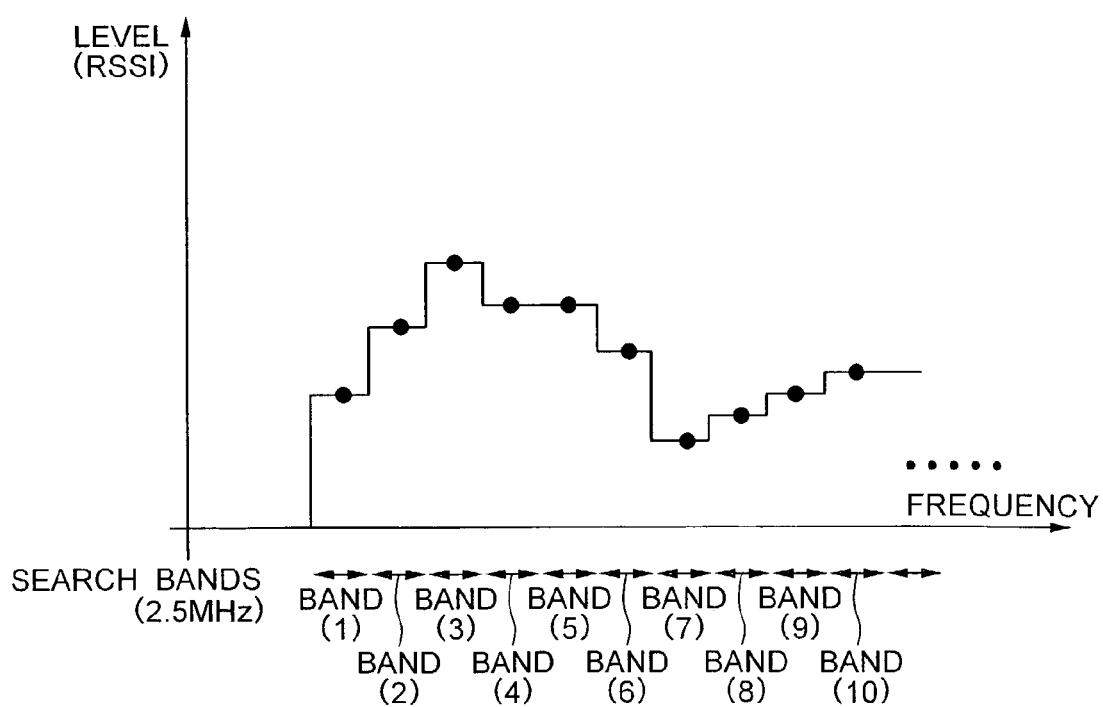
FIG. 5 is a graph showing another profile of power distribution to be detected by the cellular phone of a modification from the second embodiment.

Referring to FIG. 5, there is shown a modification from FIG. 4. In this example, whole the 60-MHz-wide band is divided by 24, and the 24-divided band portions are subjected to measurement of the received power level at the central frequency thereof in the simplified cell search for the 24-divided band portions.

Figure 6:
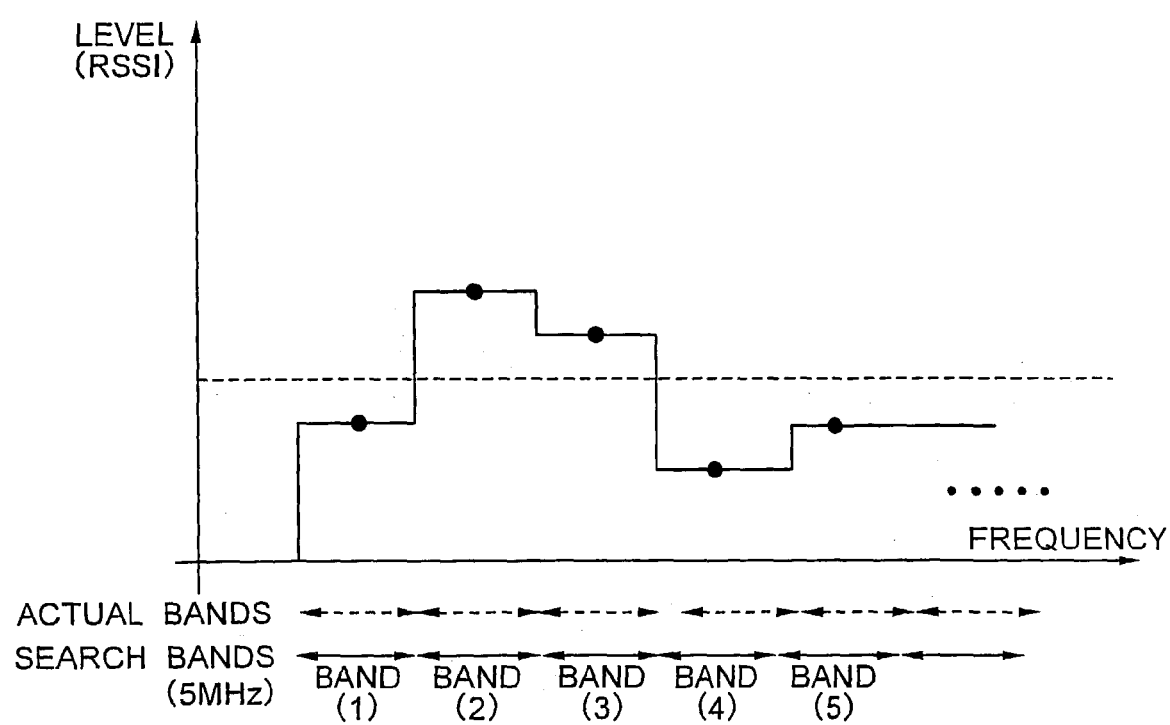
FIG. 6 is a graph showing an exemplified profile of power distribution to be detected by a cellular phone according to a third embodiment of the present invention.

Referring to FIG. 6, there is shown a profile of power distribution to be measured by a RSSI measurement circuit in a cellular phone according to a third embodiment of the present invention, which has a configuration shown in FIG. 1. In this example, after the divided band portions are subjected to measurement of received power level, the bands having received power levels higher than a threshold are selected for the ordinary cell search. The ordinary cell search is conducted for the bundle of the carriers of the selected divided band portions. In the depicted example, the bands, band(1) and band(2), are subjected to the ordinary cell search for the total 50 carriers as a bundle.

Figure 7:
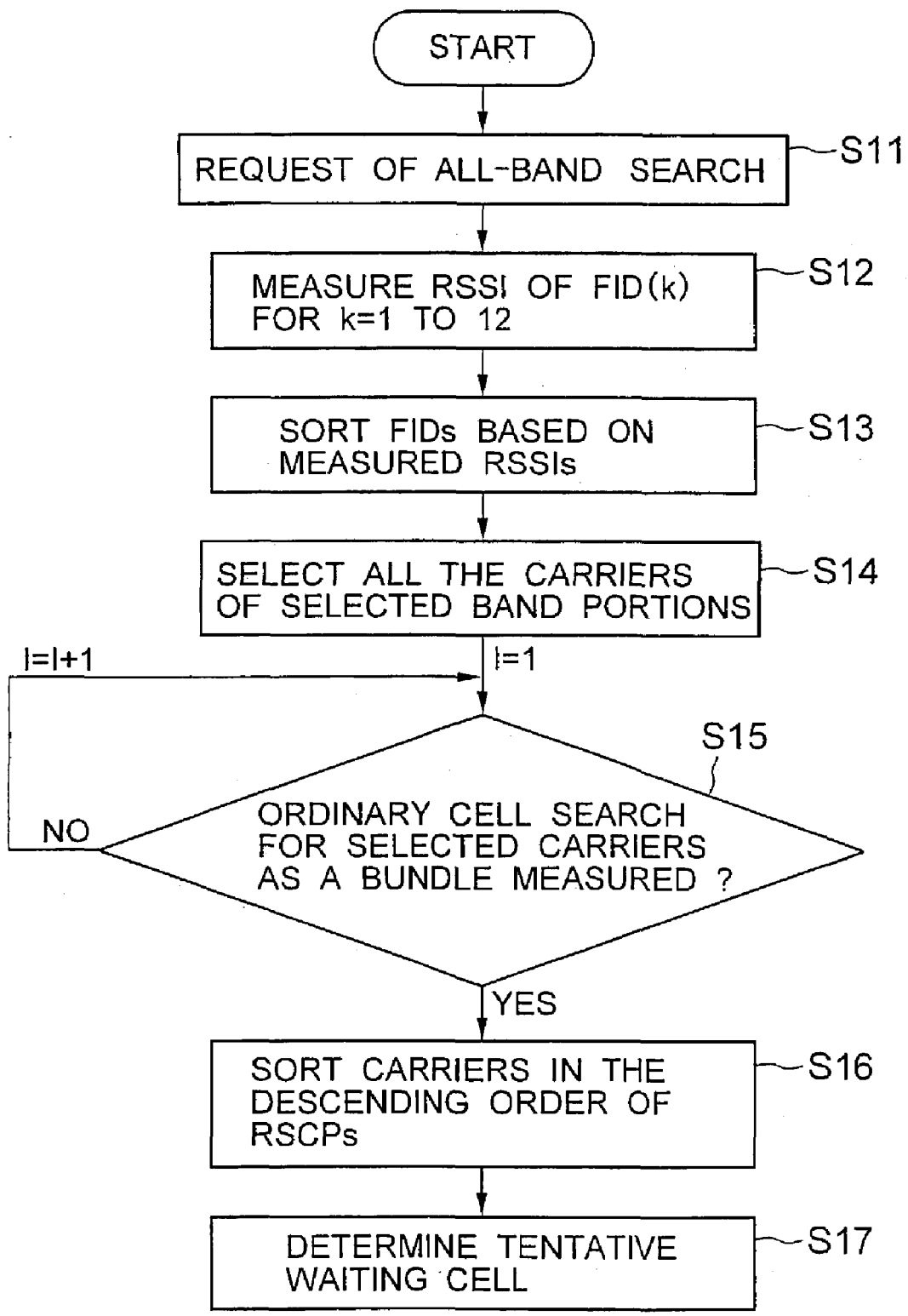
FIG. 7 is a graph showing an exemplified profile of power distribution to be detected by a cellular phone according to a fourth embodiment of the present invention.
Figure 8:
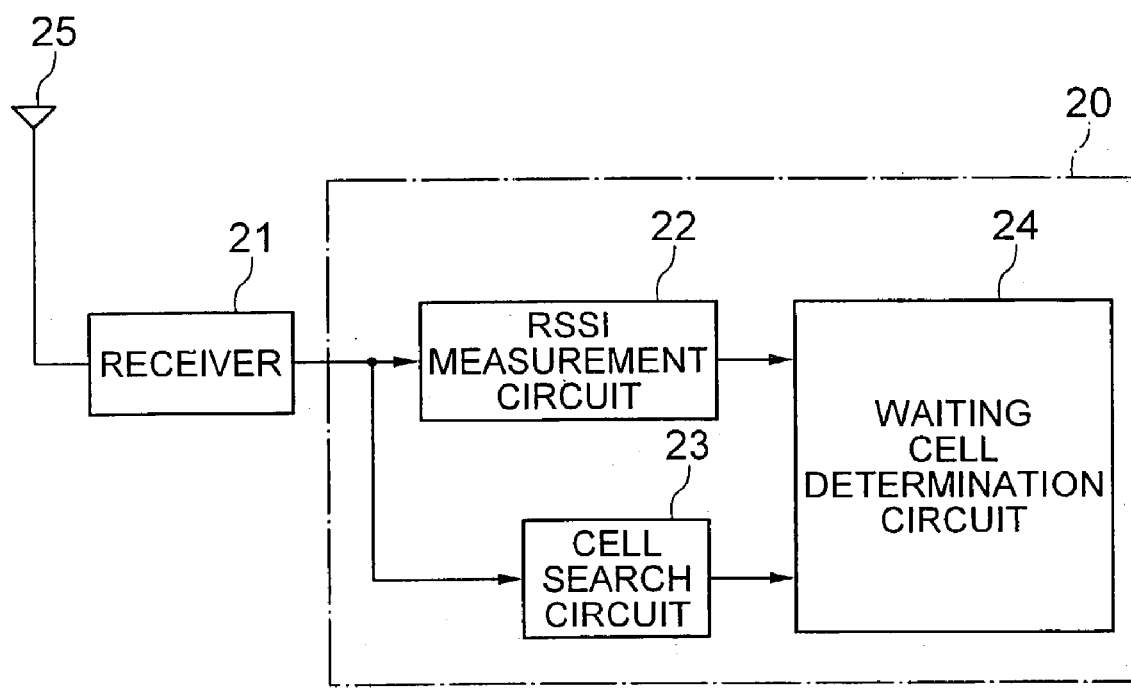
FIG. 8 is a functional block diagram of a band cell detection block of a conventional cellular phone.

Referring to FIG. 7, there is shown a flowchart of operation in cellular phone according to a fourth embodiment of the present invention. When a all-band-cell search instruction is delivered in the cellular phone (step S11), the simplified cell search or RSSI measurement is conducted for the central frequencies FID(k) of the 12-divided band portions, i.e., band(k) where k–1 to 12 in step S12.

The band sorting circuit 13 sorts the frequencies FID(i) in the descending order of RSSI levels in step S13. The band sorting circuit 13 selects some of the bands having higher RSSI levels and delivers the information of the selected bands to the receiver 11 and the cell search circuit 14. The receiver 11 and the cell search circuit 14 perform the ordinary cell search for all the carriers, FID((25×k–1)+1) to FID(25×k), of the selected bands, band(k), in a bundle in step S14.

Thus, the ordinary cell search is conducted in steps S15 and S16, similarly to steps S4 and S5 in the first embodiment, to determine the tentative waiting cell.

Although all the carriers of the selected band portions are subjected to the first through third steps for the RSCP measurement in the present embodiment, if a carrier allowing the PSC identification and having a RSCP value higher than a specified threshold is found in an earlier stage, the carrier may be selected as the tentative waiting cell. In this case, the other remaining carriers need not be subjected to the ordinary cell search.

If a half-band-cell search or 1/4-band-cell search is desired instead of the all-band-cell search, a division of whole the 60-MHz-wide band may be conducted to obtain a 30-MHz-wide band or 15-MHz-wide band. The 5-MHz-wide band used for each carrier in the cellular phone system is only an example, and thus a 10-MHz-wide band for each carrier, for example, may be used in the present invention.

Since the above embodiments are described only for examples, the present invention is not limited to the above embodiments and various modifications or alterations can be easily made therefrom by those skilled in the art without departing from the scope of the present invention.

What is claimed is:

1. A cellular phone comprising:
    a first search section for measuring a profile of power distribution of a whole band of the cellular phone to select a band portion from said whole band based on said profile of power distribution, said band portion including therein a plurality of carriers; and
    a second search section for performing an ordinary cell search for the carriers of said band portion to determine a tentative waiting cell, wherein,
    the first search section measures the profile of the power distribution of the whole band by measuring individual power levels within frequency overlapping divided bands portions that, in total, define the whole band, and
    said ordinary cell search includes slot identification, frame timing and PSC group identification, PSC identification, and RSCP measurement as prescribed in 3GPP:Ts25.124 Annex C.

2. The cellular phone according to claim 1, wherein,
    said first search section includes a RSSI measurement circuit for measuring a power level for each of divided band portions of said whole band to prepare said profile of power distribution, and a selecting circuit for selecting at least one of said divided band portions as said band portions based on the measured power levels of said at least one of said divided band portions,
    said RSSI measurement circuit measures the power level of each of said divided band portions, and
    said RSSI measurement circuit further measures the power level of a band between central frequencies of adjacent two of said divided band portions.

3. The cellular phone according to claim 2, wherein said selecting circuit includes a band sorting circuit for sorting said divided band portions based on the measured power level of said divided band portions.

4. The cellular phone according to claim 3, wherein said selecting circuit affixes priority orders to said divided band portions based on the results of sorting by said band sorting circuit.

5. The cellular phone according to claim 4, wherein said second search section performs said ordinary cell search to said carriers of each of said divided band portions consecutively in the order of said priority orders.

6. The cellular phone according to claim 2, wherein said selecting circuit selects said at least one of said divided band portions having a power level higher than a threshold.

7. The cellular phone according to claim 6, wherein said second search section performs said ordinary cell search to said carriers of said selected, divided band portions in a bundle.

8. The cellular phone according to claim 2, wherein said selecting circuit selects a group of said divided band portions having higher measured power levels than the remaining divided band portions.

9. The cellular phone according to claim 8, wherein said second search section performs said ordinary cell search to said carriers of said selected group of said divided band portions in a bundle.

10. A method for determining a waiting cell in a cellular phone comprising the steps of:
    in a 3GPP system, measuring a profile of power distribution of a whole band of the cellular phone, by measuring power levels of divided band portions of the whole band using a center frequency of each divided band portion, to select a band portion from said whole band based on said profile of power distribution, said band portion including therein a plurality of carriers; and
    searching a tentative waiting cell by using an ordinary cell search for the carriers of said selected band portion.

11. The method according to claim 10, wherein,
    said measuring step measures power levels of divided overlapping band portions of said whole band,
    said measuring step measures the power level of each of said divided band portions, and
    said measuring step further measures the power level of a band between central frequencies of adjacent two of said divided band portions.

12. The method according to claim 11, wherein said measuring step affixes priority orders to said divided band portions based on the power levels of said divided band portions, and said searching step searches said carriers of each of said divided band portions in the order of said priority orders.

13. The method according to claim 11, wherein said measuring step selects said divided band portions having power levels higher than a threshold, and said searching step searches said carriers of said selected divided band portions in a bundle.

14. The method according to claim 11, wherein said measuring step selects a group of said divided band portions having higher power levels than the remaining divided band portions, and said searching step searches said carriers of said group of said divided band portions in a bundle.

15. A cellular phone, comprising:
    an antenna (16);
    a receiver (11) connected to receive a radio frequency signal through the antenna; and
    a band-cell detection block (10) connected to an output of the receiver and connected to control the receiver, the band-cell detection block comprising
    a band sorting circuit (13),
    a RSSI measurement circuit (12) connected to the receiver output, the RSSI measurement circuit i) measuring a RSSI level of the received signal at divided bands of the whole band of the signal and ii) delivering the measured RSSI levels of the divided bands to the band sorting circuit,
    a cell search circuit (14) connected to the receiver output and connected to an output of the band sorting circuit, and
    a band cell determination circuit (15), wherein,
    the band sorting circuit sorts the divided bands based on the RSSI levels received from the RSSI measurement circuit and selects one or more of the divided bands for delivery, together with frequency information of the selected divided band, to the receiver and to the cell search circuit,
    the cell search circuit performs an ordinary cell search for carriers of the selected divided band to determine a tentative waiting cell, and
    said ordinary cell search includes slot identification, frame timing and PSC group identification, PSC identification, and RSCP measurement as prescribed in 3GPP:Ts25.124 Annex C.

16. The cellular phone of claim 15,
    an ordinary cell search examines each carrier of the selected divided band to rank the carriers in descending order of received signal code power, and selects a tentative waiting cell ranked with a highest received signal code power value.

17. The cellular phone of claim 16, wherein,
    upon a call attempt being unsuccessful, the cell search circuit sequentially selects another carrier as new tentative waiting cell based on a next-highest received signal code power value.

18. The cellular phone of claim 17, wherein,
    upon all call attempts being unsuccessful, the cell search circuit performs the ordinary cell search for carriers of a new selected divided band, the new selected divided band selected based on the RSSI levels received from the RSSI measurement circuit.

19. The cellular phone of claim 15, wherein,
    the RSSI measurement circuit measures the RSSI level of the received signal at all divided bands of the whole band of the signal divided as a first set of bands that define the whole band without frequency overlap.

20. The cellular phone of claim 19, wherein,
    the RSSI measurement circuit measures the RSSI level of the received signal at all divided bands of the whole band of the signal divided as
    the first set of bands that define the whole band without frequency overlap, and
    a second set of bands that define at least a portion of the whole band without frequency overlap,
    each band of the second set overlapping two bands of the first set.

21. The cellular phone of claim 15, wherein,
    an ordinary cell search examines carriers of the selected divided band portions to and selects a first carrier with received signal code power value higher than a specified threshold as a tentative waiting cell.

* * * * *